Figure 13:
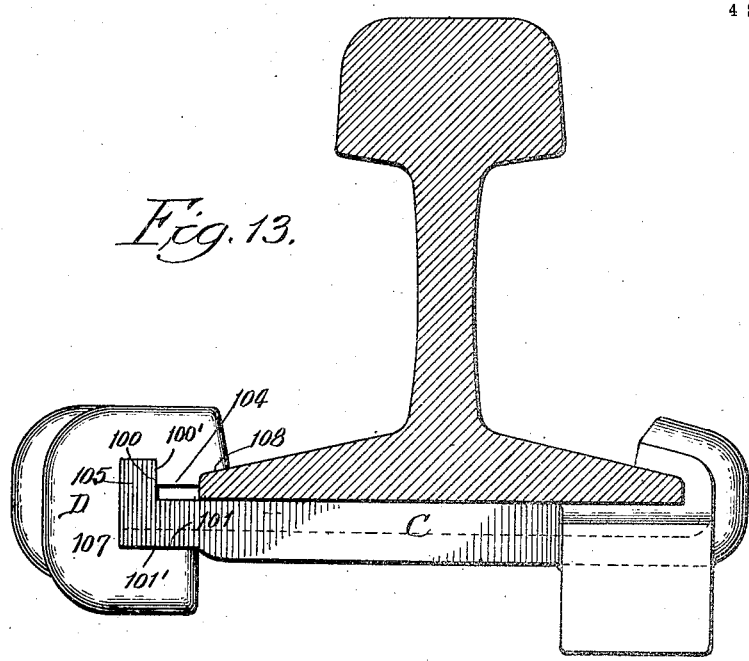

H. G. ELFBORG.
ANTI-RAIL CREEPER.
APPLICATION FILED JULY 12, 1913.
1,083,603.
Patented Jan. 6, 1914.
4 SHEETS—SHEET 1.
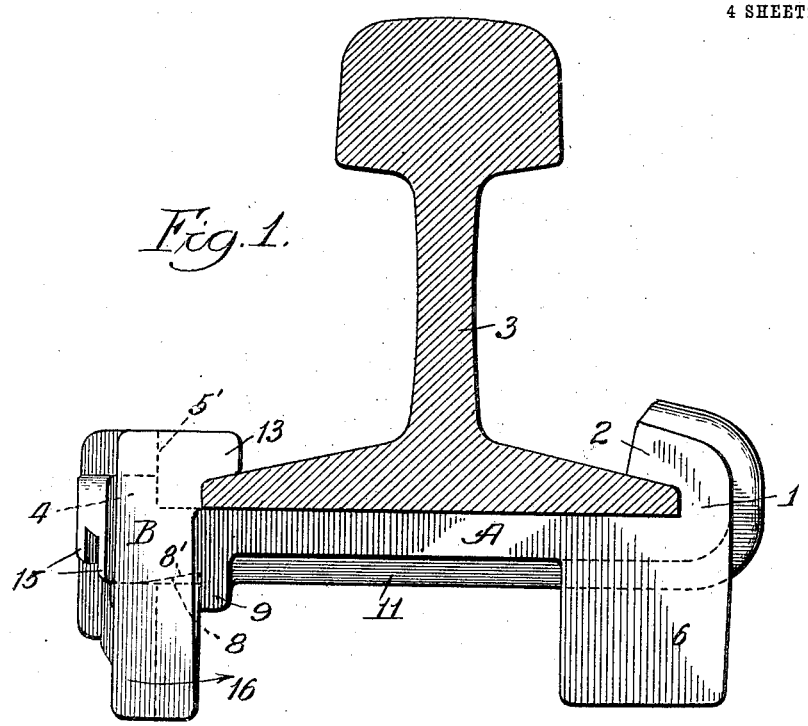
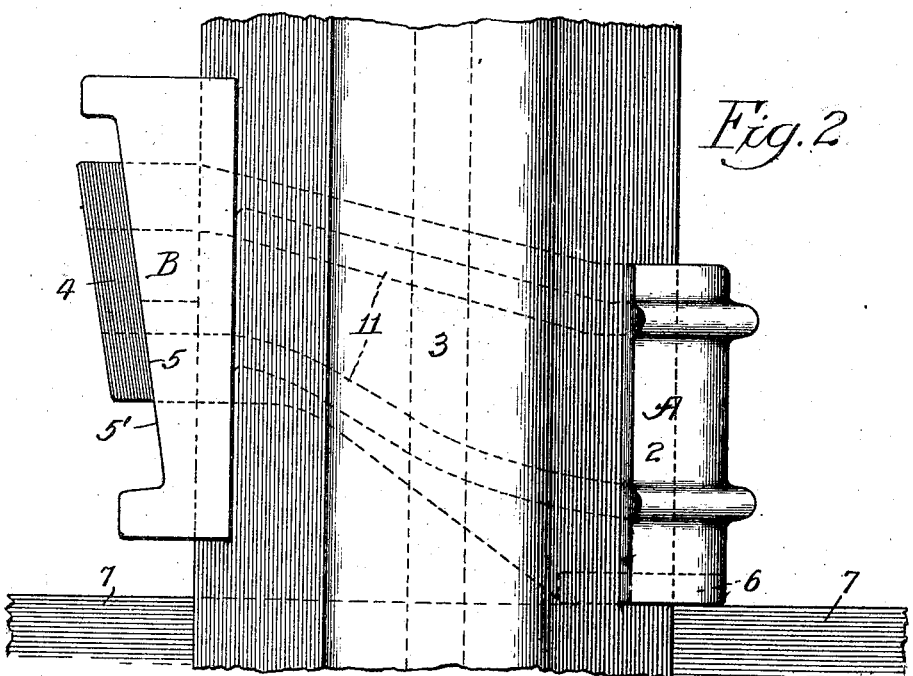
Witnesses:
John Enders
C. M. Anderson
Inventor:
Henry G. Elfborg,
by Sheridan, Wilkinson, Scott & Richmond,
Attys.

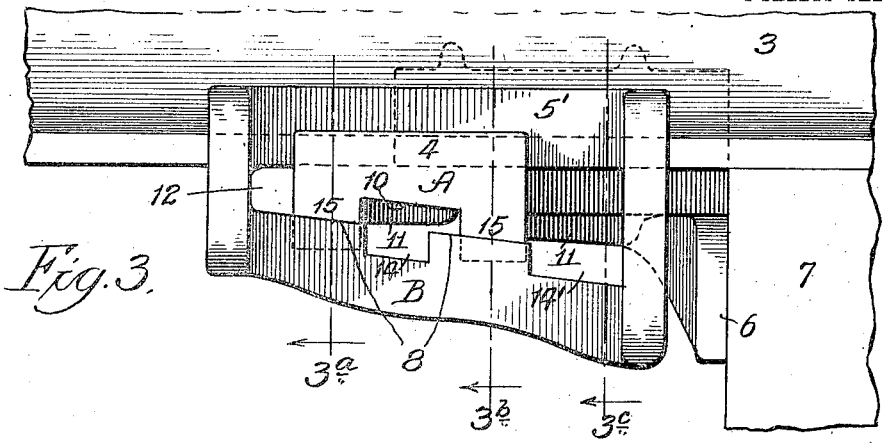
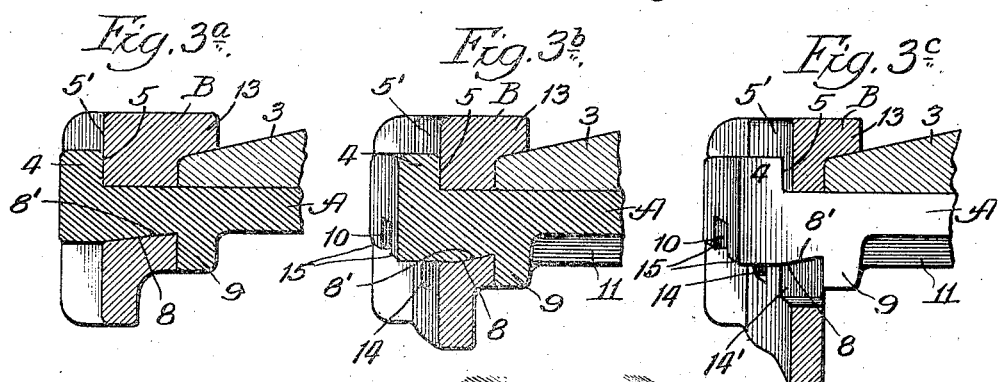
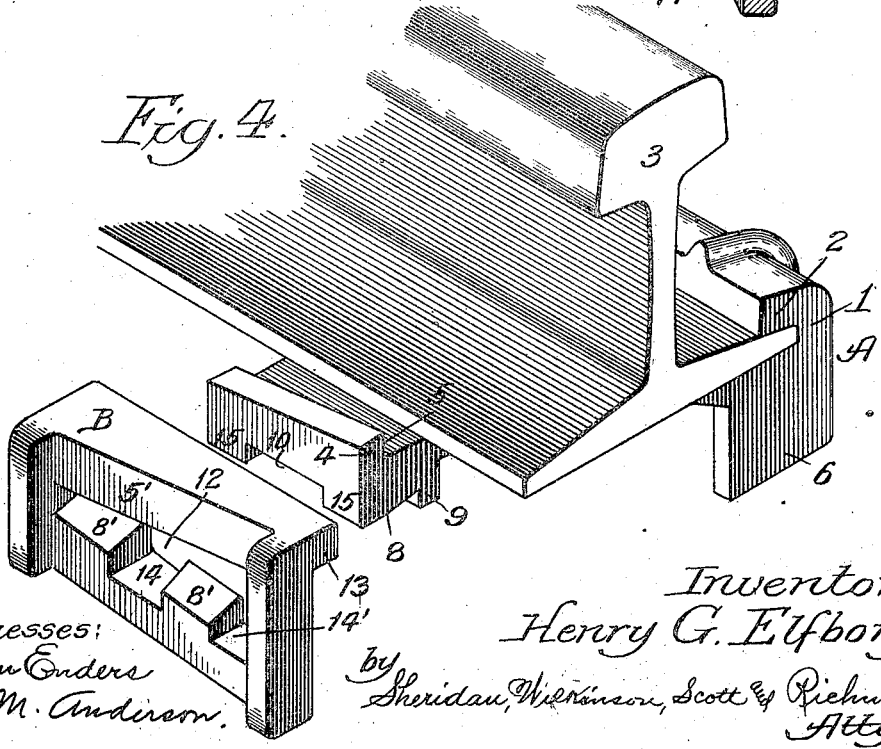

H. G. ELFBORG.
ANTI-RAIL CREEPER.
APPLICATION FILED JULY 12, 1913.
1,083,603.
Patented Jan. 6, 1914.
4 SHEETS—SHEET 3.
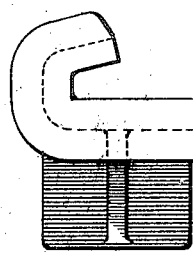
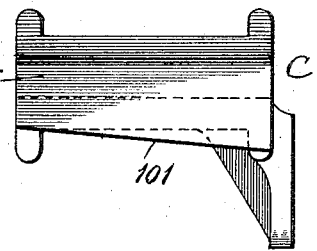
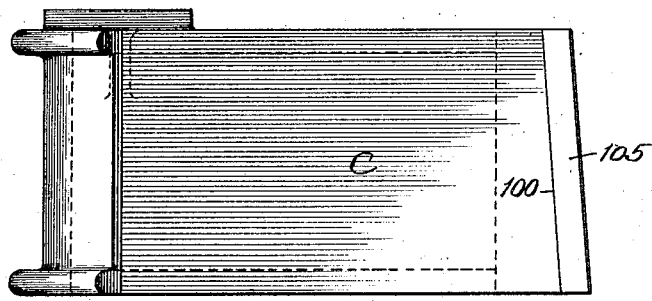
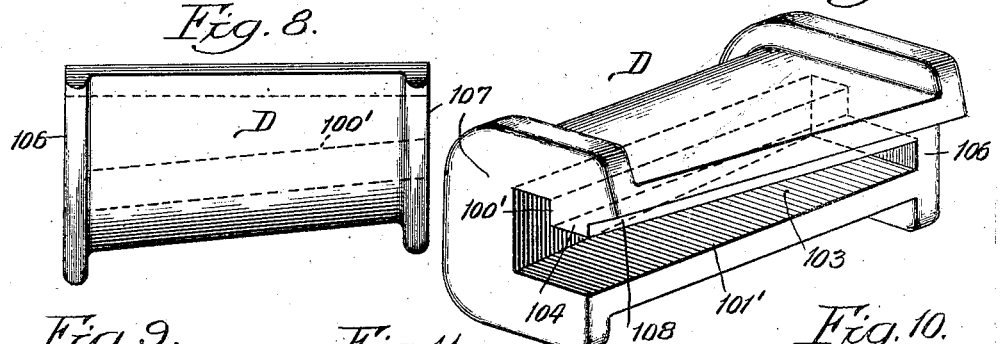
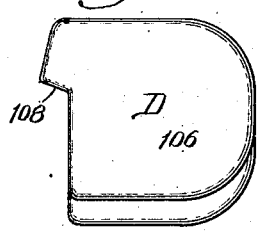
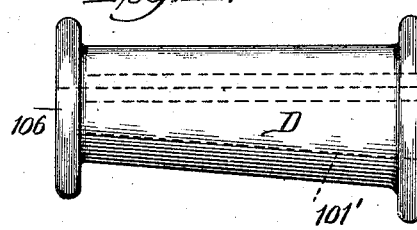
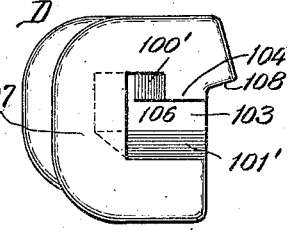
Witnesses:
John Enders
E. M. Anderson
Inventor:
Henry G. Elfborg,
by Sheridan, Wilkinson, Scott & Richmond
Attys

H. G. ELFBORG.
ANTI-RAIL CREEPER.
APPLICATION FILED JULY 12, 1913.

1,083,603.

Patented Jan. 6, 1914.

4 SHEETS—SHEET 4.

Witnesses:
John Enders
E. M. Anderson.

Inventor:
Henry G. Elfborg,
by Sheridan, Wilkinson, Scott & Richmond
Attys.

UNITED STATES PATENT OFFICE.

HENRY G. ELFBORG, OF CHICAGO, ILLINOIS, ASSIGNOR TO AJAX RAIL ANCHOR CO., OF CHICAGO, ILLINOIS, A CORPORATION OF DELAWARE.

ANTI-RAIL-CREEPER.

1,083,603.  Specification of Letters Patent.  Patented Jan. 6, 1914.

Application filed July 12, 1913. Serial No. 778,680.

*To all whom it may concern:*

Be it known that I, HENRY G. ELFBORG, a citizen of the United States, residing at Chicago, in the county of Cook and State of Illinois, have invented certain new and useful Improvements in Anti-Rail-Creepers, of which the following is a specification.

My invention consists in an improved device for preventing the longitudinal creeping of the rails of a railway track relative to the ties.

The object and advantages of my improvement are clearly set forth in the following description and claims and are illustrated in the drawings.

Among the objects of my invention are the simplification of a device of this kind and reduction in the number of parts without sacrifice of efficiency, and an improvement in the operation of the device in securing a greater frictional contact between the stationary anti-creeper device and the rail to which it is applied.

As will be apparent from the following description and claims, together with the drawing, my improved device not only grips the opposite edges of the rail-base, but also secures a firm frictional grip between the under surface of the rail base and the co-acting part of the anti-creeper structure.

Figure 14:
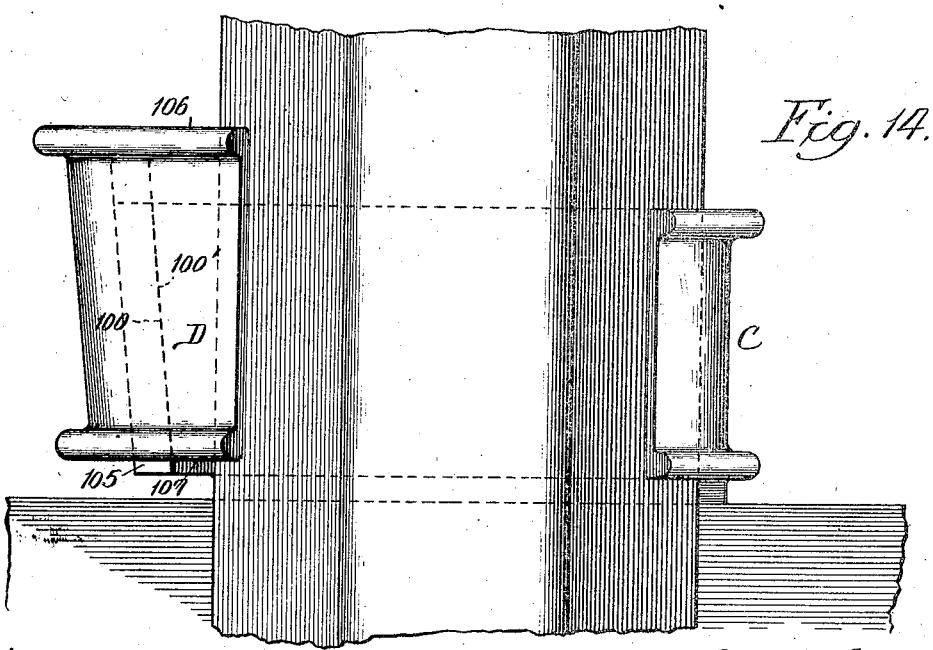

In the drawings Figure 1 is a cross section of a rail with my improved anti-creeper applied thereto. Fig. 2 is a plan view of the same. Fig. 3 is a side elevation looking from the left of Figs. 1 and 2. Figs. 3ª, 3ᵇ and 3ᶜ are sections taken respectively on the like numbered lines appearing upon Fig. 3. Fig. 4 is a perspective view showing the rail and the elements of the anti-creeper in perspective, the parts being partially separated, but arranged in substantially their correct relation to one another. Fig. 5 is an elevation view of the main member of another embodiment of my invention. Figs. 6 and 7 are plan and end views respectively of the main member shown in Fig. 5. Fig. 8 is a plan view of the wedge member adapted to coact with the main member shown in Fig. 5. Figs. 9 and 10 are views of the opposite ends of the wedge shown in Fig. 8. Fig. 11 is a side elevation of the wedge member shown in Figs. 8, 9 and 10. Fig. 12 is a perspective view of the wedge member shown in Figs. 8 to 11. Fig. 13 is an elevation transversely of the rail, which is in section, of the assembled structure shown in Figs. 5 to 12. Fig. 14 is a plan view of the structure shown in Fig. 13.

While my invention is not restricted to either of the specific embodiments illustrated and described in this application, I have selected the two forms referred to as those preferred by me at this time and as forming a basis for an explanation of the principle of my invention.

Referring first to the embodiment of the invention illustrated in Figs. 1 to 4, the structure consists essentially of two elements, a main member designated A and a wedge member designated B. The main member A is formed at one end with an upturned lip or shoulder 1 which may be inturned, as shown at 2, to embrace the edge and part of the upper surface of the rail base. The main member A is adapted to extend beneath and in contact with the lower surface of the base of the rail 3 and projects beyond the opposite edge of the rail base. At the end opposite the lip 1 the main member A is provided with an upstanding shoulder 4, the inner substantially vertical face 5 of which converges toward the adjacent edge of the rail base in the direction of an adjacent tie 7, against which the downwardly extending abutment 6 at the opposite end of the main member is adapted to bear. The under side of the end of the member A opposite the lip or shoulder 1—2 is provided with a surface 8, which inclines downwardly toward the adjacent tie 7. This sloping part of the under side of the main member A preferably also has an inclination in an upward direction from the end of said member, as shown in the drawings, and at the inner limit of said sloping or inclined surface 8 I preferably provide the main member with downwardly extending lugs 9. The wedge end of the main member A, that is, the end opposite the lip or shoulder 1—2, is provided upon its under surface with a notch 10 extending endwise of said member, said notch serving to remove the central portion of the depending part of the end member upon which the inclined surface 8 is formed. I have illustrated the main member A as provided upon its under and outer surface with strengthening ribs 11 and have also shown the main member A of such form as to extend across the rail base at an inclination thereto, as clearly illustrated in Fig. 2. The wedge member B, adapted to coact with the wedge end of the main member A, is best illustrated in its entirety at the left of Fig. 4 where the parts are shown in perspective. In this particular embodiment of the invention the wedge member is provided with a central slot or opening 12 and is adapted to be passed over and to embrace the wedge end of the main member. The outer side of the portion of the wedge member B above the slot 12 is formed with a surface 5′ which, when the parts are assembled, converges toward the rail in the direction of the adjacent tie 7, the surface 5′ upon the wedge member being adapted to coact with the surface 5 upon the shoulder 4 of the main member, thereby serving to wedge the upper part of the wedge member B between the shoulder 4 of the main member and the adjacent edge of the rail base when said wedge member is driven or otherwise impelled toward the tie 7. The upper part of the wedge member B is formed on its inner side with a lip 13 adapted to overlie the edge of the base of the rail 3. The lower part of the wedge member B below the slot 12 therein is provided on its upper side with a surface 8′ having an inclination, when the parts are assembled, corresponding to the inclination above described, of the surface 8 on the lower side of the wedge end of the main member. That is, the surface 8′ upon the wedge member slopes downwardly toward the tie 7 and upwardly toward the rail. The lower part of the wedge member B below the slot 12 is notched upon its upper surface, as indicated at 14 and 14′.

In assembling the device, the main member A is placed under the rail with its lip or shoulder 1—2 embracing one edge of the base thereof and with the abutment 6 against one of the ties, the device being placed upon that side of the tie from which the greatest volume of traffic moves. This position of the main member is well illustrated in Fig. 4 and the proximity of the device to the adjacent tie is indicated in Figs. 2 and 3. The wedge member B is then mounted upon the wedge end of the main member, the slot 12 in the wedge member being of sufficient depth vertically to receive the end of the main member when the notch 10 in the lower side of the main member is made to register with the part of the wedge member which projects upwardly between the slots 14, 14′, at which time the notches 14, 14′ register with the downwardly projecting portions 15 of the main member at the sides of the notch 10. After the wedge member B is placed over the wedge end of the main member, it is lowered so that the upper part of the wedge member above the slot 12 therein lies between the shoulder 4 of the main member and the adjacent edge of the rail base with the inclined surfaces 5, 5′ of the main member and wedge member in contact. The dropping of the wedge member to this position causes the projections at the sides of the notches 14, 14′ in the wedge member to clear the projections 15, 15 at the sides of the notches 10 in the main member, thus permitting the wedge member to be driven toward the tie and thereby setting up a wedging action between the surfaces 5′, 5 and 8′, 8 of the wedge member and main member. The coaction between the surfaces 5′, 5 causes the upper part of the wedge member to exert transverse pressure upon the edge of the rail base, thereby firmly gripping the rail between said wedge member and the lip or shoulder 1—2 at the opposite end of the main member. The coaction between the surfaces 8, 8′ of the main member and wedge member, when the wedge member is driven toward the tie or otherwise impelled in that direction, has the effect of drawing the main member upward against the under surface of the rail base by reason of the fact that the lip 13 of the wedge member overlies the edge of the rail base, while the movement of the wedge member toward the tie forces the main member upwardly by reason of the inclination of the coacting surfaces 8, 8′. The depending lugs 9 upon the main member serve to prevent the wedge member from tilting in the direction of the arrow 16, appearing in Fig. 1, and the inclination of the surfaces 8, 8′ transversely of the rail serves to prevent the wedge member from tilting in the opposite direction.

In the initial assemblage of the device, as above stated, the abutment 6 upon the main member bears against the adjacent tie toward which traffic is moving and the wedge member is forcibly driven to its seat, thereby insuring a gripping of the opposite edges of the rail base between the wedge member and the opposite end of the main member and further securing a firm hold on the rail by reason of the pressure set up between the upper surface of the main member and the lower surface of the rail base. Any tendency of the rail to creep in practice would, by reason of the frictional grip thereon exercised by the wedge, tend to force the wedge still farther to its seat, thereby more firmly gripping the rail, and furthermore, any tendency of the rail to creep would necessarily result in a tendency to rotate the main member A by reason of the frictional grip between the main member and rail base, and the fact that the abutment 6 of the main member holds that end of the main member stationary by reason of its bearing against the tie. Any such tendency to rotation on the part of the main member would also tend to more securely grip the edges of the base flange between the wedge member B and the opposite end of the main member.

In Figs. 5 to 14 I have illustrated another structure embodying the principles of my invention, but differing from the form above described in mechanical details. In this form the main member C is quite similar in general outline to the main member A of the structure above described. It differs, however, in that the inclined surface 101 upon the lower side of the end opposite the upturned lip or shoulder is not provided with any notch corresponding to the notch 10 of the structure illustrated in Figs. 1 to 4. The inclined surface 100 upon the main member C corresponds in function and location to the inclined surface 5 of the form first described. The wedge member of the modified structure is quite different in form from the wedge member of the first modification, though not differing essentially therefrom in its principle of operation. The modified wedge member D has in a general way the form of a box open along one side and at one end. The opening or slot 103 along the side of the wedge member has its lower face 101' inclined to correspond to the inclination 101 on the lower side of the wedge end of the main member C, and from the upper wall of the opening or slot 103 along the side of the wedge member there depends a rib 104 having along its inner face an inclined surface 100' corresponding in inclination to the inclined face 100 upon the upwardly projecting shoulder 105 of the wedge end of the main member. The wedge member is closed at the end 106, this end being shown in Fig. 9, but at the opposite end the slot or opening 103 along the side of the wedge member has an open end, that is, extends completely through the end 107 of the wedge member, the end 107 being shown in Fig. 10 of the drawing.

In assembling the device the open end 107 of the wedge member is passed over the wedge end of the main member from the side thereof shown in Fig. 5 with the surface 100' coacting with the surface 100 and the surface 101' coacting with the surface 101. The coaction between the surfaces 100 and 100' causes the rail base to be gripped between the wedge member and the upstanding lip or shoulder at the opposite end of the main member, the wedge member being suitably recessed at 108 to receive the adjacent edge of the rail base and to partially overlie the top thereof. The coaction between the inclined surfaces 101 and 101' has the effect of forcing the main member upward against the rail base, thereby setting up a binding frictional hold between the upper surface of the main member and the lower surface of the rail base. The theory of operation of the embodiment of my invention illustrated in Figs. 5 to 11 is substantially similar to the operation of the embodiment of my invention first illustrated and described.

While I have in detail described and illustrated two specific embodiments of the principles of my invention, it will be apparent that these principles can be utilized in mechanical structures of widely different forms and that my invention is not restricted to the specific details of structure herein illustrated and described for the purpose of making a clear presentation of my invention.

I claim:

1. An anti-creeper comprising a rail, a member having a jaw engaging the upper side of and vertically supported by one edge of the base of said rail and extending beneath and in contact with said rail, a second member engaging the upper surface of the opposite side of said rail base and the lower surface of the end of said first-named member opposite the jaw thereon, one of said members being adapted to abut against an adjacent tie, said members having two pairs of coacting surfaces each inclined longitudinally of said rail, the relative movement of said members acting through one pair of said inclined surfaces to grip the opposite edges of said rail base and through the other pair of inclined surfaces to force said first-named member against the bottom of said rail base.

2. An anti-creeper for railroad rails comprising a main member adapted to underlie the base of a rail and to bear against a tie, one end of said main member having an upwardly extending part adapted to directly engage the edge of the rail base, and the other end of said main member having an upwardly extending shoulder converging in a horizontal plane with the opposite edge of the rail base toward said tie, said last mentioned end of said main member having also a surface on its under side inclining downwardly toward said tie, and a wedge member having one part coacting with said upwardly extending shoulder of said main member and the adjacent edge of the rail base and having a depending part underlying and coacting with said inclined under surface of the main member, whereby when said wedge member is impelled toward said tie the opposite edges of the rail base are clamped between said wedge member and the upwardly extending part of the opposite end of said main member and said main member is forced upwardly against the under side of said rail base.

3. An anti-creeper for railroad rails comprising a main member adapted to underlie the base of a rail and to bear against a tie, one end of said main member having an upwardly extending part adapted to directly engage the edge of the rail base, and the other end of said main member having an upwardly extending shoulder converging in a horizontal plane with the opposite edge of the rail base toward said tie, said last mentioned end of said main member having also a downwardly projecting lug, the lower surface of which has a longitudinally inclined surface, and a slotted wedge member adapted to embrace the last named end of said main member, a lug projecting upwardly from the lower wall of the slot in said wedge, the upper surface of said lug having a longitudinally inclined surface corresponding to the inclination of the downwardly extending lug on the main member, the upper part of said wedge member above the slot therein having an inclined outer side surface adapted to coact with the inclined upwardly extending shoulder on the main member and adapted on its inner side to engage the adjacent part of the rail base.

4. An anti-creeper for railroad rails comprising a main member adapted to underlie the base of a rail and to bear against a tie, one end of said main member having an upwardly extending part adapted to directly engage the edge of the rail base, and the other end of said main member having an upwardly extending shoulder converging in a horizontal plane with the opposite edge of the rail base toward said tie, said last mentioned end of said main member having also downwardly projecting lugs, the lower surfaces of which incline longitudinally, a slotted wedge member adapted to embrace the last named end of said main member, lugs projecting upwardly from the lower wall of the slot in said wedge, the upper surfaces of said lugs inclining longitudinally corresponding to the inclination of the downwardly extending lugs in the main member, the upper part of said wedge member above the slot therein having an inclined outer side surface adapted to coact with the inclined upwardly extending shoulder on the main member and adapted on its inner side to engage the adjacent part of the rail base.

5. An anti-creeper for railroad rails comprising a main member adapted to underlie the base of a rail and to bear against a tie, one end of said main member having an upwardly extending part adapted to directly engage the edge of the rail base, and the other end of said main member having an upwardly extending shoulder converging in a horizontal plane with the opposite edge of the rail base toward said tie, said last mentioned end of said main member having also downwardly projecting lugs, the lower surfaces of which incline longitudinally and transversely and stop shoulders at the inner edges of said inclined surfaces, a slotted wedge member adapted to embrace the last named end of said main member, lugs projecting upwardly from the lower wall of the slot in said wedge, the upper surfaces of said lugs inclining longitudinally and transversely corresponding to the inclination of the downwardly extending lugs on the main member, the upper part of said wedge member above the slot therein having an inclined outer side surface adapted to coact with the inclined upwardly extending shoulder on the main member and adapted on its inner side to engage the adjacent part of the rail base.

6. In a device of the class described, a rail, a main member having a jaw at one end embracing one edge of the rail base, said main member extending beneath said rail to the opposite edge thereof, a wedge member engaging the upper side of the opposite edge of the rail base and also extending beneath a part of said main member, said main and wedge members having two pairs of coacting wedge surfaces, both pairs being inclined longitudinally of said rail.

7. An anti-creeper for railroad rails comprising a member adapted to underlie the base of a rail, one end of said member having an upwardly extending part adapted to directly engage the edge of the rail base and the other end of said member having an upwardly extending shoulder converging in a horizontal plane with the opposite edge of the rail base toward said tie, said last mentioned end of said member also having a surface inclining downwardly toward said tie, and a wedge member having one part coacting with said upwardly extending shoulder of said first-named member and the adjacent edge of the rail base and having a part coacting with said downwardly inclined surface of the first-named member, whereby when said wedge member is impelled toward said tie the opposite edges of the rail base are clamped between said wedge member and the upwardly extending part of the opposite end of said first-named member and said first-named member is forced upwardly against the under side of said rail base, one of said members having a part adapted to abut against a tie.

In testimony whereof, I have subscribed my name.

HENRY G. ELFBORG.

Witnesses:
JOHN ENDERS,
HENRY A. PARKS.

---

Copies of this patent may be obtained for five cents each, by addressing the "Commissioner of Patents, Washington, D. C."